June 24, 1952 E. H. B. BARTELINK 2,601,425

SUPERVISORY SIGNALING CIRCUITS FOR CARRIER WAVE COMMUNICATION SYSTEMS AND THE LIKE

Filed Sept. 16, 1949 2 SHEETS—SHEET 1

INVENTOR.

EVERHARD H. B. BARTELINK.

BY Ward, Crosby & Neal.

ATTORNEYS.

INVENTOR.
EVERHARD H.B. BARTELINK.
BY Ward, Crosby & Neal,
ATTORNEYS.

Patented June 24, 1952

2,601,425

UNITED STATES PATENT OFFICE 2,601,425

SUPERVISORY SIGNALING CIRCUITS FOR CARRIER WAVE COMMUNICATION SYSTEMS AND THE LIKE

Everhard H. B. Bartelink, Bronxville, N. Y., assignor, by mesne assignments, to Automatic Electric Laboratories, Inc., Chicago, Ill., a corporation of Delaware Application September 16, 1949, Serial No. 116,192

19 Claims. (Cl. 179—84)

Figure 1:
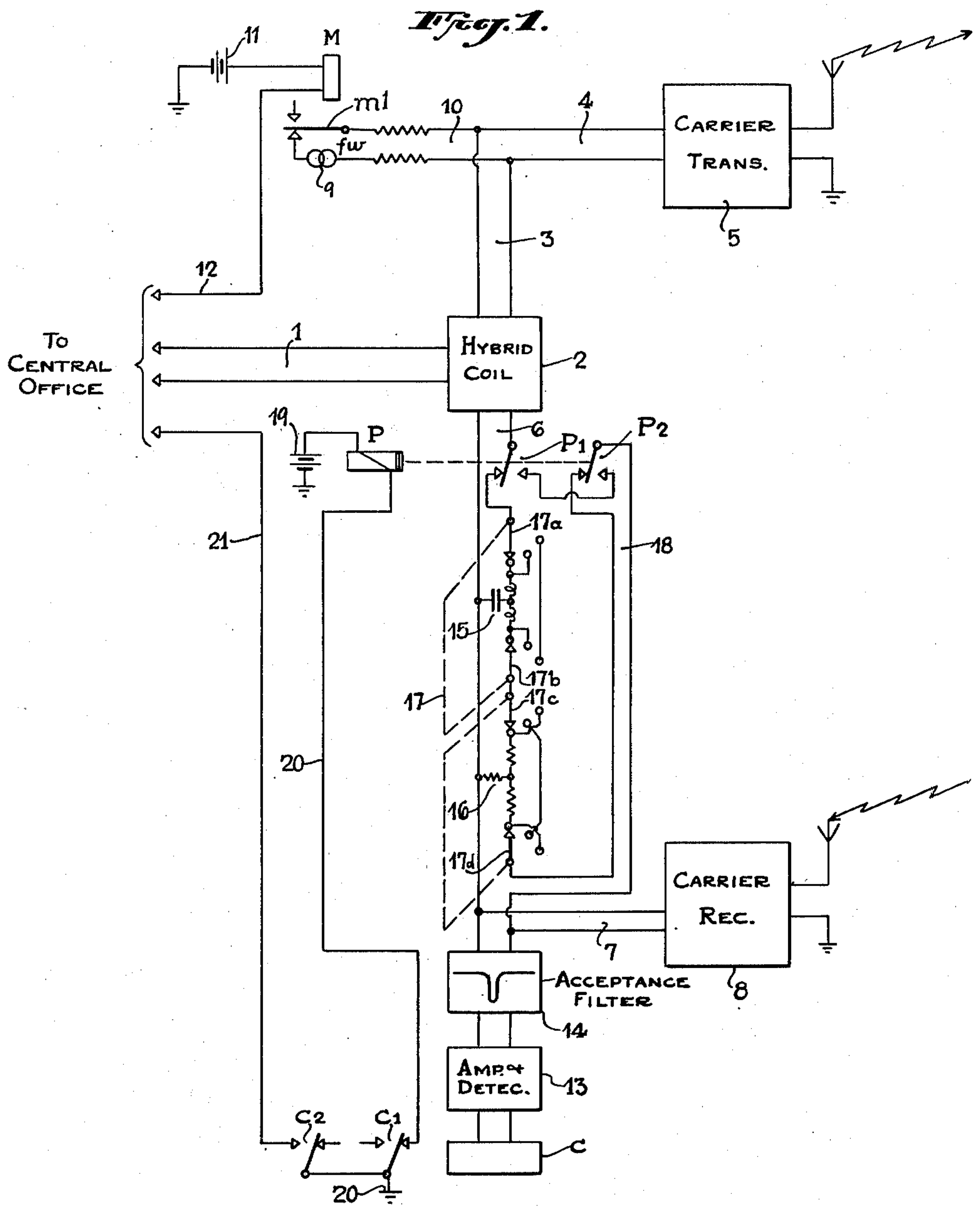

This invention pertains to improvements in signaling circuits employed in conjunction with carrier current or radio telephone circuits or voice-frequency metallic circuits which contain amplifiers, for relaying supervision, dialing and ringing current signals thereover. A primary object of the invention is to provide novel and relatively simple and economical circuit arrangements employing tone signals, for effecting two-way dialing, supervision and circuit control over carrier or radio links interposed in telephone circuits, and in such manner as to prevent the supervisory tone signals from being transmitted beyond the carrier or radio control terminals over the metallic circuits extending from the control terminals to the central offices or subscribers' stations. Another object is to improve the stability of such circuits against feedback or "singing" effects.

The carrier or radio link terminations employed in conjunction with the invention are of conventional design insofar as concerns speech transmission. That is to say, each of the "east" and "west" carrier or radio link terminations includes a carrier current transmitter and a carrier current receiver, coupled through a hybrid system to a two-wire, audio-frequency metallic circuit which extends the telephone circuit both west and east from the carrier or radio terminations, and through one or more central offices to the calling and called subscribers' stations.

The invention may likewise be employed in conjunction with voice-frequency, four-wire metallic circuits which contain amplifiers and which are hybrid-coupled at the "east" and "west" terminals, to conventional two-wire metallic circuits for extending the connection as aforesaid.

The invention is grounded on the concept of employing preferably, although not necessarily, two distinctive tones of differing frequencies in the audio-frequency range and within the speech transmission band of the telephone circuit, for transmitting the supervision signals aforesaid over the channels "east" and "west" respectively, of the radio or carrier link or four-wire, voice-frequency amplifier circuit, in conjunction with which a transmission network, comprising either a low pass filter or an attenuator, or a series combination of these two, is insertable, by means of a relay, and during signaling periods, in the connections extending from the carrier receiver output to the hybrid system or extending from the incoming four-wire, voice-frequency metallic circuit to the hybrid coil.

For signaling over a carrier or radio link from

"west" to "east," one of these tone frequencies is impressed on the "west" carrier transmitter and thus transmitted to the "east" carrier receiver, to actuate a tone receiver relay thereat. Conversely, for signaling from "east" to "west," the other tone frequency is impressed on the "east" carrier transmitter and thus transmitted to the "west" carrier receiver, to actuate a tone receiver relay thereat. In the case of four-wire, voice-frequency amplifier circuits, the tones are impressed directly on the channels "east" and "west" respectively.

The aforesaid transmission networks interposed, during signaling, between the carrier receiver or incoming voice-frequency amplifier circuit output and the hybrid system at each terminal, serves to prevent the transmission of the signaling tones over the two-wire metallic circuits extending thence to the central offices and subscribers' telephone stations. The thus interposed network also serves to prevent the supervision tone received, for example, at the "west" terminal, from entering the hybrid system thereat and being transmitted to "east" as a result of hybrid system unbalances during switching operations, such as would otherwise occur in the absence of the so interposed impedance. In this way, the invention eliminates feedback or "singing" in the hybrid termination channels "east" and "west."

The present standard techniques employing tone frequencies in the voice-frequency range for signaling and supervision over carrier or radio channels interposed in telephone lines, in general employ the same tone frequency for transmitting supervisory, dialing and ringing signals in both "east" and "west" directions. Thus, to signal from west to east, this tone frequency is impressed on the carrier transmitter at the west terminal, and transmitted to east over the carrier or radio west-to-east channel, the reverse procedure being employed in transmitting the supervisory signals from east to west over the east-to-west radio or carrier channel.

With this conventional arrangement, a rejection filter is inserted, at each carrier terminal, between the carrier transmitter input and the hybrid system output coupled thereto, in order to prevent any components of the tone signaling frequencies from being transmitted into the metallic circuit extending from the hybrid system to the subscriber's station. This rejection filter is of course tuned to suppress the tone frequency in the circuit path in question. A similar rejection filter is also interposed at each carrier terminal between the carrier receiver output and the hybrid system input to which the carrier receiver is coupled. In addition, an acceptance filter which is tuned to pass the tone frequency, is connected between the carrier receiver output and an amplifier-detector combination, which latter operates a receiver signaling relay. With this arrangement the signaling tone impressed on the carrier transmitter at the "west" terminal will be transmitted over the carrier channel to the "east" terminal and will operate the tone receiver relay thereat, and vice versa for the signaling tone impressed on the carrier transmitter at the "east" terminal, which will operate the tone receiver relay at the "west" terminal.

The rejection filters in question serve the additional function of preventing the signaling tone which is impressed for example on the carrier transmitter at the "west" terminal for transmission over the carrier channel going east, from entering the acceptance filter in the output of the "west" carrier receiver, and which is receiving signals from the east terminal, such as might otherwise occur whenever imperfections are present in the hybrid coil balances. Such a direct transmission from the "west" tone oscillator to the "west" receiver signaling relay, if it occurs at a sufficiently high level, might put the "west" receiver signaling relay under direct control of the "west" tone oscillator, rather than under control of the distant or "east" tone oscillator, which should be controlling it.

In accordance with one aspect of the present invention, these sharply tuned rejection filters are completely eliminated and replaced, at each carrier terminal, by a single low pass filter, or attenuator, or by a series combination of both, automatically interposed during signaling between the carrier receiver output and the hybrid system input connected thereto, in conjunction with which either a single line frequency or two different tone frequencies may be used for signaling in the "west" and "east" directions respectively.

According to the preferred embodiment of the invention, two different tone frequencies are employed which may be in the higher region of the speech transmission band of the telephone circuit, but are above the cutoff frequency of the aforesaid low pass filter, which is employed, with or without the attenuator, in accordance with the preferred embodiment of the invention. The frequency difference between the two tone frequencies is also sufficiently great that even in the case of serious hybrid system unbalances, there is sufficient rejection in the acceptance filter, preceding the receiving amplifier-detector-relay combination, to prevent the receiving relay at, for example, the "west" station, from being operated by the "west" tone oscillator. In general it is desirable to prevent these supervision tones from being transmitted over the metallic circuits from the carrier terminations to the subscribers' stations, and it is primarily for this purpose that the low pass filter referred to, is interposed between the hybrid coil and the carrier receiver output. The attenuator serves to prevent excessive feedback in the carrier or radio link during the idle condition and during switching operations, when the impedance connected across the line side of the hybrid system may be radically different from the normal line impedance for which the hybrid system is balanced.

In the telephone circuits incorporating four-wire amplifier telephone circuits, or carrier current circuits or radio links, the speech transmission band circuit is ordinarily about 300 to 3000 C. P. S. Assuming these conditions, the tone frequencies for supervision and signaling are preferably selected in the upper region of this band where the energy of speech components is low. Thus, for example, tone signaling frequencies of 2000 and 2500 C. P. S. respectively may be employed. For preventing these tone frequencies from entering the metallic circuits extending from the carrier or radio terminations, a low pass filter having a cutoff of about 500 to 1000 C. P. S. is preferably inserted, during signaling, between the hybrid coil and the carrier receiver output. A low pass filter having a cutoff frequency of this order, will pass the dial tones, busy tones, and ring-back tones with very little attenuation, and yet effectively suppress the supervision tones at the "east" and "west" carrier or radio terminations.

The low pass filter, attenuator or filter-attenuator combination, is inserted in the circuit by means of a relay which is controlled by the tone receiver relay. The signaling tones are normally applied to the telephone line only when the line is idle, and are automatically removed when the line is ready for transmission of speech. As soon as a subscriber or operator energizes the line, in the case of the subscriber by closing the local loop to his exchange, the tone is removed. When dial pulses are transmitted, the tone is reapplied for periods corresponding to each of the circuit interruptions generated by the dial. These tone pulses will appear across the subscriber's line being fed through the hybrid coil, but as the subscriber's and operator's phones are normally disabled by the "off-normal" contact incorporated in the dial, they will not be heard.

In the case of connections extending between dial telephone exchanges, when the distant subscriber or operator answers a call, battery reversal or other suitable supervision is applied to the central office or toll equipment, and this will remove the supervision tone from the line at the distant end.

With the circuit arrangement of the present invention, the carrier currents of the main carrier or radio transmitter are transmitted continuously on the channels, "west" and "east" respectivtly, so that by the use of suitable sub-carrier equipment, the same carrier current or radio link may be employed concurrently for handling a number of telephone channels free from mutual interference as regards transmission of either speech or supervisory signals.

A feature of the present invention resides in the following: Normal speech contains some components in the frequency bands adjacent to and including the tone signaling frequencies, and it is therefore theoretically possible that during conversation the tone receiver relays may momentarily operate. If the connection extends through dial switching equipment, this equipment is protected against collapsing of the connection during such short operations of the tone receiver relays, provided they do not appreciably exceed the duration of dial pulses. Insofar as concerns the subscribers, such short duration operations of the tone receiver relays would result in momentary loss of high frequency responses, in speech transmission, which is hardly observable to the subscribers. To avoid even such occurrences, however, the present invention provides preventive measures. The supervision tones are transmitted at a relatively high intensity level, which is several decibels higher than the normal speech level at frequencies in the vicinity of the tone frequencies. In consequence the operating margins of the receiving relays may be so adjusted as to respond to the tone frequencies, but not to respond to the corresponding frequencies in speech transmission. In addition, the tone receiver relay is made fast-operating to follow the dialing pulses, while the relay responsive thereto which inserts the filter-attenuator network is made slow operate and release, so that it holds up during dialing pulses or other momentary release of the tone receiver relay.

A manually actuated gang switch is provided in conjunction with the transmission network, which is actuatable to any of several positions for optionally by-passing either the filter or the attenuator or for including these two components in series, in accordance with the circuit operation desired.

Having thus described the invention in general terms, reference will now be had for a more detailed description thereof, to the accompanying drawings, wherein:

Figure 1 is a diagrammatic circuit layout of a carrier current or radio link, telephone line termination, incorporating the two-tone frequency supervision signaling circuits in accordance with the preferred embodiment of the invention, wherein either the low pass filter or the attenuator, or both, may optionally be interposed as aforesaid, during signaling, between the hybrid system and the carrier receiver or receiving amplifier channel output.

Figure 2:
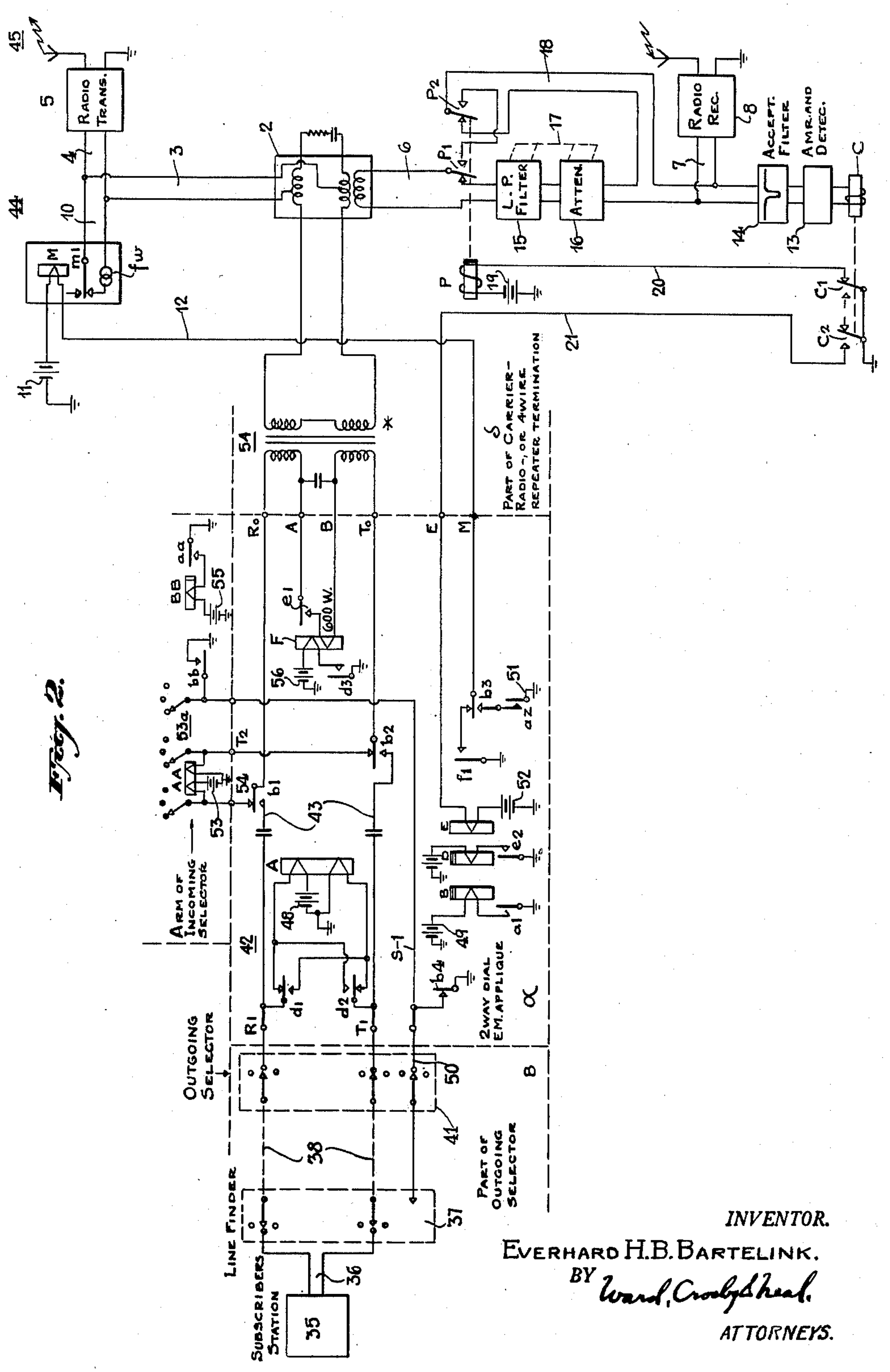

Figure 2 illustrates the Fig. 1 embodiment, as incorporated in a telephone trunk line extending between automatic telephone exchanges and as arranged for two-way dialing over the trunk line.

Referring to Fig. 1, there is shown a two-wire, audio-frequency metallic telephone line 1, extending from a "west" central office to the "west" termination of a carrier or radio or four-wire amplifier link, and connected thereat through a hybrid coil 2, and thence over circuits 3, 4, to the audio-frequency input of a transmitter line amplifier or a carrier current transmitter or radio transmitter designated by the rectangle 5 and indicated in the drawing as a radio transmitter for illustrative purposes only. Hybrid coil 2 is also connected over a circuit 6, 7, to the audio-frequency output of a receiving line amplifier, a carrier current or radio receiver designated by the rectangle 8, and indicated in the drawing, merely for purposes of illustration, as a radio receiver. As stated, Fig. 1 shows the "west" terminal of a four-wire, voice-frequency, metallic amplifier circuit, or a carrier current or radio link, interposed in a metallic circuit 1, it being understood that the distant or "east" terminal is similarly arranged, and that the description herein applies to either terminal by merely substituting "east" for "west," or vice versa wherever occurring.

For signaling from "west" to "east" a tone frequency $f_w$ is normally impressed on the line transmitter amplifier or carrier transmitter 5 at the "west" terminal and transmitted over the west-to-east channel to the "east" terminal. This is effected by means of a tone oscillator 9, the output circuit 10 from which is under control of a relay M through its contacts $m$–1, the relay in turn being controlled over an energizing circuit 11, 12, in the manner explained below. Relay M is normally released so that in the "line idle" condition the tone $f_w$ is continuously transmitted to the "east" terminal through the armature and back contact of the M relay. A similar arrangement at the "east" terminal normally transmits a tone frequency $f_e$ to the "west" line receiver amplifier or carrier receiver 8 over the east-to-west channel. The tone frequency $f_e$ thus received, operates a tone receiver relay C, which is connected to the output of an amplifier-detector unit 13, the input to which is in turn connected through an acceptance filter 14, adapted to pass the frequency $f_e$ received from the output circuit 7 of the line receiver amplifier or carrier receiver 8. A transmission network comprising a low pass filter 15, an attenuator 16, or a series combination of these two elements, depending on the positioning of a gang switch 17, is interposable, by operation of a relay P, in the circuit 6, extending from the hybrid coil 2 to the output circuit 7. If the rotary switch arms 17*a* to 17*d* inc., of gang switch 17 are on their left-hand fixed contacts as shown, the filter-attenuator combination will thus be interposed, whereas if the switch arms are moved to their middle contacts only the filter 15 will be interposed, and if moved to their right-hand contacts, only the attenuator 16 will be thus interposed. Irrespective of the positioning of switch 17, the low pass filter 15 and the attenuator 16 are switched out of the circuit 6 during the periods of speech transmission through by-passing connections 18 extending through the $p$–1, $p$–2 armatures and back contacts of the P relay. Upon energization of this relay, however, the filter 15, attenuator 16, or both, depending on the setting of switch 17, is or are switched into circuit 6 through the $p$–1, $p$–2 armatures and front contacts of the relay. By preference this relay P is of the slow-operating type, and is employed in conjunction with a fast-operating C relay for reasons above explained; although for use in termination units which permit either ringdown or dial operation, a slow-operating, slow-release relay P is preferred in conjunction with a fast-operating C relay.

The P relay is energized from grounded battery 19 over a connection 20 extending through the $c$–1 front contact and grounded armature of the C relay. Accordingly, the filter 15, attenuator 16, or filter-attenuator combination, is switched into circuit 6 during operation of the C relay, i. e., during receipt of the tone frequency $f_e$ from the east terminal. Switching in of the low pass filter during receipt of the tone frequency prevents the tone frequency from being transmitted into the metallic circuit 1. Switching in of the attenuator 16 during transmission of the tone frequency prevents excessive feedback or "singing" around the "east" and "west" channels of the amplifier four-wire circuit or the radio or carrier link such as would otherwise tend to occur during switching operations as a result of hybrid unbalances. Thus, during the switching and idle periods when the impedance unbalances are most pronounced and oscillation or "singing" is most likely to occur, the gain is reduced, while it is restored as soon as both sides of the line are properly terminated. By thus eliminating the danger of "singing" in the unterminated condition, higher gains are permissible during the speech transmission periods. The C relay also functions to relay signals into the central office over a connection 21 extending from ground through the $c$–2 armature and back contact of the C relay, and for purposes explained below.

Fig. 2 shows the invention as employed in a trunk line interconnecting automatic exchange central offices, and as arranged for two-way dialing over the trunk. Only sufficient of the automatic exchange equipment will be described to show how the various subscriber actions, when translated into distinctive signals by the dial exchange equipment, are transmitted by the signaling circuit of the invention over a four-wire, voice-frequency metallic amplifier circuit, or a carrier or radio link interposed in the trunk circuit. The automatic exchange equipment shown is of the step-by-step type, but the same principles are applicable to other types of automatic exchanges.

Referring to Fig. 2, a subscriber's station 35 is connected over a loop 36 to a line finder 37, and is automatically connectible thence over connection 38, by appropriate dialing operations, through one or more selector switches until it is thus extended to a selector switch 41, to the fixed contacts of which one or more trunk lines, such as 42, is or are connected. Trunk line 42 extends over a two-wire, audio-frequency circuit 43 to a four-wire amplifier circuit or carrier or radio terminal in accordance with the present invention, and as shown generally at 44. It is to be understood that the distant end of the four-wire amplifier circuit, radio or carrier link, similarly extends to a termination identical with 44, which is in turn coupled over a metallic circuit corresponding to 43, to a central office termination corresponding to 42. The remaining components of the Fig. 2 showing are best explained by reference to the manner in which the circuit operates.

Thus, assume that the subscriber at station 35 desires to call a distant subscriber reached over a trunk line such as 42. Whein the subscriber lifts his handset from the switch hook, the line finder 41 automatically finds the calling subscriber's line 36 in the conventional manner of automatic telephone exchange equipment. The line finder will in turn connect the subscriber's line 36 over connections 38 to a free first selector switch, and subsequent selector switches where applicable, such as 41. As soon as a free first selector switch has thus been seized, dial tone will be transmitted to station 35 to advise the subscriber that the circuit is ready for dialing. Assume, now, that all of the trunk lines, such as 42, extending to the distant exchange through which the called subscriber must be reached, have numbers starting with the digit 3. The subscriber will accordingly dial a 3 as his first digit. This lifts the selector switch 41 to the third level, where it will hunt for a free two-way dial trunk, such as 42, all of which trunks will extend to fixed contacts on the third level of selector switch 41. As soon as a trunk line such as 42 has thus been seized, relay A, normally bridged thereacross through back contacts *d*–1, *d*–2 of a relay D, will operate over a circuit traced from grounded battery 48, thence through the upper winding of relay A, back contacts *d*–1 of relay D, thence over the subscriber's loop and through the subscriber's telephone set, returning over the loop circuit and through back contacts *d*–2, and through the lower winding of relay A to ground. As stated, relay A will operate over this circuit and, through closure of its *a*–1 contacts, will energize the slow release relay B from battery 49, which relay will remain energized during dialing pulses. Relay B, upon energization, closes its contacts *b*–4 to apply ground to a control lead S–1, which protects the appliqué unit against seizure, over a control connection extending therefrom to the outgoing selectors, as at 50, by other calls.

Operation of relay B also closes its lower contacts *b*–3, thus connecting ground at 51 through contacts *a*–2 of the A relay, to operate the M relay in the "west" tone oscillator circuit, which removes the tone of frequency $f_W$ from the radio transmitter 5. The operating circuit for relay M is traced from grounded battery 11 through the winding of the M relay, thence over conductor 12 and through the *b*–3 and *a*–2 contacts of the B and A relays, to ground at 51. Relay M, thus operated, removes the supervisory signaling tone of frequency $f_W$, transmitted to the distant or "east" carrier receiver, to release the C relay thereat.

The release of relay C at the distant end, in turn operates the E relay thereat, over a circuit traced from grounded battery, such as 52, through the winding of the distant end relay E, and thence over a connection, such as 21, to ground through the distant end C relay back contacts *c*–2. Release of the distant end C relay also releases through its *c*–1 front contacts, the distant end P relay, to remove the low pass filter 15 and/or attenuator 16 from circuit 6 extending between the hybrid coil and the carrier receiver output thereat, and to substitute therefor the by-passing connections 18.

Operation of the distant E relay closes its contacts *e*–1 to operate the AA relay of the incoming selector switch thereat, over a circuit traced from grounded battery, as at 53, through the left-hand winding of the AA relay, thence through the *b*–1 back contact and armature of the B relay and through the upper winding of an isolating transformer, as at 54, thence through contacts *e*–1 of the E relay and through the lower winding of the F relay, thence through the lower winding of the isolating transformer 54 and through the *b*–2 armature and back contact of the B relay, returning thence to ground through the right-hand winding of the AA relay. Relay F does not operate over the current thus supplied through its lower winding. The AA relay, however, operates over the circuit above traced, and in turn energizes the distant BB relay over a circuit traced from grounded battery as at 55, through the BB relay winding to ground through the *aa* armature and front contact of the AA relay. The resulting operation of the distant end BBrelay, applies ground through its *bb* armature and front contact to distant end control lead S–1. This protects the appliqué unit thereat against seizure by the distant end outgoing selectors in the manner above explained.

Closure of the *e*–2 contact of the distant end E relay, operates the D relay, but the battery reversal thus effected through its *d*–1, *c*–2 contacts from the battery thereat corresponding to 48, has no effect, because the distant end appliqué unit is now protected against seizure by the distant end outgoing selectors in the manner above explained. Operation of the distant end D relay also closes its *d*–3 contact, which in turn closes a circuit from grounded battery, as at 56, through the upper winding of the F relay to ground through the *d*–1 contact of relay D. Relay F will not, however, operate, as the current thus supplied through its upper winding is opposed to that supplied through its lower winding from battery 53, the latter, as above stated, being insufficient of itself to operate the relay. The distant end M relay remains de-energized, thereby continuously to transmit the tone frequency $f_E$ to the near end receiving relay which thereby remains energized, in turn to maintain the P relay energized whereby the filter 15 and/or attenuator 16 remain inserted in the near end circuit 6. Also, at the near or calling end, the operation of the B relay thereat completely removes, through its back contacts *b*–1 and *b*–2, the two-way dial trunk 42 from the arms of the next incoming selector switch 53*a* thereat.

The circuit is now ready for transmission of subsequent dial pulses by the subscriber at the calling station 35. These dial pulses will operate the A relay at the outgoing end of the trunk, in accordance with the dialing interruptions of the current from battery 48 flowing through the A relay windings and over the subscriber's loop. Contacts *a*–2' of this A relay, will transmit these pulses over connection 12 to the M relay of the tone oscillator at the calling end. The M relay will thus follow the dialing pulses and, through its contacts *m*–1, will apply corresponding pulses of the tone frequency $f_w$ to the carrier or radio transmitter 5 for modulating the outgoing carrier thereof and transmitting the same to the distant end carrier or radio receiver 8. At the distant end, this incoming dial-pulse-modulated carrier will be received by the distant end carrier or radio receiver 8, and upon demodulation thereof, apply the pulses of tone frequency $f_w$ through the acceptance filter 14, to the tuned amplifier and detector 13 thereat, thus to operate the distant end C relay in accordance with the received dial pulses. In the case of a four-wire, voice-frequency amplifier circuit, the tone will be transmitted directly and without modulation. The resulting dial pulse actuation of the distant end C relay will, through its *c*–2 contacts, correspondingly actuate the distant end E relay, and the resulting dial pulse actuations of the distant end E relay will extend the connection through the distant end automatic telephone exchange incoming selectors, such as 53*a*, to the called subscriber's line, in the manner described below with reference to incoming calls. The distant end P relay in the termination unit, being slow to operate and slow to release, will not follow these dial pulses, but will remain operated to remove the filter 15 and/or attenuator 16 from the distant end circuit 6. At the near end, however, the filter and/or attenuator remain inserted in the near end circuit 6, because, as was above explained, the incoming tone frequency $f_e$ has not as yet been interrupted.

When the distant or called subscriber answers by removing his handset from the switch hook, the polarity across the distant end AA relay in the incoming selector thereat, is reversed so that the currents in both windings of the F relay now become aiding, thus to operate the F relay over the circuits above traced. The F relay, on thus operating, operates the distant end M relay over a circuit traced from battery 11, thence through the M relay winding and over connection 12 through the *b*–3 armature and back contact of the distant end B relay, which is de-energized, and thence to ground through the *f*–1 front contact and armature of the now energized F relay. The resulting operation of the distant end M relay interrupts the tone of frequency $f_e$ transmitted to the calling end, thus to release the near end C relay, in turn to release the near end P relay and operate the E relay. The P relay removes the filter and/or attenuator in the near end circuit 6. Operation of the near end E relay in turn operates through its *e*–2 contacts, the near end D relay, operation of which in turn reverses the battery from 48 applied to the tip and ring conductors of the calling subscriber's line, by switching the armatures *d*–1, *d*–2 of the D relay from their back to their front contacts. This battery reversal gives reverse battery signaling to the preceding selector switches at the calling end automatic exchange, and thus signals that the called party has answered.

If, at the end of the call, the called party hangs up first, the polarity across relay AA will restore to normal, the currents in the winding of relay F will become opposing, and relay F accordingly releases. Through the resulting opening of contacts *f*–1, this releases the distant end M relay. This will restore the tone of frequency $f_e$ transmitted to the near end C relay, which will accordingly operate, in turn to operate the near end P relay and release the near end E relay. The P relay, thus energized, inserts filter 15 and/or attenuator 16 into the near end circuit 6. Release of the E relay releases relay D and thus restores the battery polarity on the tip and sleeve conductors of the calling line to normal. When the calling party subsequently hangs up, the near end relay A will release, thereby releasing the near end B relay. Release of these two relays will de-energize the near end M relay, due to opening of its operating circuit at the *a*–2, *b*–3 contacts of the A and B relays. Release of the near end M relay will in turn restore the signaling tone of frequency $f_w$, outgoing to the distant end, to energize the C and P relays thereat, and release the E and F relays, in turn to release relays AA and BB. Release of the B relay at the calling end and the BB relay at the called end, will remove the ground through their *b*–4 and *bb* contacts from the S–1 leads at the calling and called ends respectively, and at the same time reconnect the trunk through the *b*–1, *b*–2 contacts of the B relay to the incoming selector at the calling end, thus rendering the trunk available for seizure on subsequent incoming or outgoing calls. All circuits are thus restored to normal.

If, on the other hand, at the end of the call, the calling party hangs up first, this will release the near end A and B relays and thus by opening contacts *a*–2 and *b*–3, restore the supervision tone $f_w$ at the calling end. In addition, the B relay reconnects through its *b*–1 and *b*–2 contacts, the returning circuit of the trunk line 42 to the switch arms of the next outgoing selector switch mechanism 41, while removing the ground at its *b*–4 contacts from the S–1 lead. In this switching operation, the AA relay operates over the circuit traced from battery 53 through the *b*–1, *b*–2 back contacts of the B relay, the *e*–1 contacts of the E relay and the lower winding of the F relay. Operation of the AA relay in turn operates through its *aa*–1 contacts, the BB relay, the operation of which latter in turn applies through its *bb*–1 contacts, ground to the control lead S–1, thus protecting the appliqué unit from the preceding selector switches. It should be borne in mind that during this interval, the near end E relay remains operated, since the tone of frequency $f_e$ is still being suppressed at the called end to release the near end C relay. And the fact that the E relay thus remains operated permits the AA relay to operate as aforesaid through back contacts *b*–1, *b*–2 of the B relay and contacts *e*–1 of the E relay at the near end. When, now, the called party hangs up, this releases the distant end M relay, and thus restores the signaling tone of frequency $f_e$ outgoing from the distant end. At the near end, this operates the C relay, in turn to release the near end E relay, which in turn opens its contacts $e$-1, thereby releasing the AA and BB relays in the next switching station 53$a$.

On an incoming call, the C relay is released by removal of the tone of frequency $f_e$, received from the distant end. Release of the C relay in turn operates the near end E relay and releases the P relay. The E relay closes its contacts $e$-1. This energizes the AA relay in the incoming selector mechanism, through the back contacts $b$-1, $b$-2 of the B relay which is not energized. Operation of the AA relay, through its contacts $aa$-1, operates relay BB, which latter, through its contacts $bb$-1, applies ground to the control lead S-1. The latter protects the appliqué unit from seizure by the preceding switches. Contacts $e$-2 of the near end E relay, in turn operate the near end slow release relay D, which closes its contacts $d$-3, thereby energizing the upper winding of the F relay. As was explained above, the AA relay is energized over the circuit traced through the back $b$-1, $b$-2 contacts of the B relay, and through the $e$-1 contacts of the E relay. This current flowing through the lower winding of the F relay is not sufficient to operate it. The polarity of the current flow in the lower winding of the F relay is, in this condition, opposed to that in the upper winding, and in consequence of this the F relay does not operate. Under these conditions it is impossible for the near end A and B relays to operate, because the appliqué unit is protected against seizure by the ground applied at contacts $bb$-1 to the S-1 lead. Thus, the contacts $b$-3 of the B relay, are in the position shown on the drawing, and the near end M relay is accordingly under control of contacts $f$-1 of the F relay. The distant subscriber can now transmit dial pulses and thus control the operation of the following incoming switching trains, such as 53$a$, to select the desired called subscriber. This is accomplished by dial pulse actuation of the near end C relay, which in turn correspondingly actuates the near end E relay.

When the called subscriber answers, this reverses the polarity of current applied by the AA relay, so that the current now flowing in the lower winding of the F relay, aids that in the upper winding thereof. The F relay accordingly operates and applies ground through its $f$-1 contacts, to operate the M relay at the called end. Operation of the M relay at the called end, in turn removes signaling tone of frequency $f_w$ to the distant trunk terminal to release the C and P, and operate the E and D, relays thereat. The latter applies battery reversal through its contacts $d$-1, $d$-2 to the tip and sleeve conductors at the calling end, thus advising that the called party has answered. These operations complete the connection. Restoration of all circuits is effected at the end of the call in the manner above described.

When the circuit of the invention is employed for carrier or radio termination on ringdown toll lines having a carrier or radio link interposed therein, certain modifications are made in the interconnection of the elements described here. Ringing current is transmitted over the carrier or radio link by short, repetitive spurts of the tone frequencies $f_w$ and $f_e$. In this case a polarized M relay is used, which is actuated by alternate half cycles of the ringing current, in turn corresponding to transmit pulses of the tone frequency to the distant end where they correspondingly actuate the C relay, in turn to actuate an appropriate signaling device thereat. The P relay, being slow-release, will remain operated during these pulse trains, and may be used to control a local source of energy voltage.

As above explained, normal speech contains some components in the frequency bands around $f_e$ and $f_w$, and it is therefore theoretically possible that during the conversation the C relays may momentarily operate. The dial switching equipment is protected against collapsing of the connection through such short operations of the C relay, provided they do not appreciably exceed the duration of dial pulses. For the subscriber such short duration operations of the C relays would result in a momentary loss of high-frequency response which should hardly be noticeable. To avoid such an occurrence, however, two preventative measures are employed in accordance with the present invention. In the first place, the supervision tones are transmitted at a level which is a few decibels higher than the normal level during speech transmission in the energy content of normal speech, falling in the narrow frequency regions around $f_e$ and $f_w$. As this is only a small fraction of the total energy of the speech, which averages around "zero" level, a large amount of protection is obtained in this fashion. It was proven experimentally that proper protection can thus be obtained against false operation of the C relays by these high-frequency speech components. In the second place, as the level of the supervision tones $f_e$ and $f_w$ is reduced and the sensitivity of the tone amplifier correspondingly increased, the margin of protection of the C relays may be reduced to a point where occasional operation of the C relays occurs. These operations are of extremely short duration and by making the P relay slow to operate as well as slow to release, they are prevented from affecting the transmission path since they are of too short a duration to operate the P relay and thus interpose the filter and/or attenuator in the system.

What I claim is:

1. In a communication system: a transmission line connected to a hybrid system, said system having an output circuit connected to a transmitting channel, and having an input circuit connected to a receiving channel; a generator for generating signals at a signaling frequency, and means including a relay for connecting said generator to said transmitting channel; a tuned circuit connected to said receiving channel, said circuit being tuned to pass signals received at a signaling frequency; a transmission network, and switching means connected to said tuned circuit and responsive to reception of said last-mentioned signals, for connecting said network between said hybrid system input circuit and said receiving channel during reception of said last-mentioned signals.

2. In a communication system: a transmission line connected to a hybrid system, said system having an output circuit connected to a transmitting channel, and having an input circuit connected to a receiving channel; a generator for generating signals at a signaling frequency, and means including a relay for connecting said generator to said transmitting channel; a tuned circuit connected to said receiving channel, said circuit being tuned to pass signals received at a signaling frequency; a transmission network including a low pass filter, and switching means connected to said tuned circuit and responsive to reception of said last-mentioned signals for connecting said network between said hybrid system input circuit and said receiving channel during reception of said last-mentioned signals, said filter having a cutoff below said signaling frequencies.

3. In a communication system: a transmission line connected to a hybrid system, said system having an output circuit connected to a transmitting channel, and having an input circuit connected to a receiving channel; a generator for generating signals at a signaling frequency, and means including a relay for connecting said generator to said transmitting channel; a tuned circuit connected to the output of said receiving channel, said circuit being tuned to pass signals received at a signaling frequency; a transmission network attenuator, and switching means connected to said tuned circuit and responsive to reception of said last-mentioned signals, for connecting said network between said hybrid system and said receiving channel during reception of said last-mentioned signals.

4. In a communication system: a transmission line connected to a hybrid system, said system having an output circuit connected to a transmitting channel, and having an input circuit connected to a receiving channel; a generator for generating signals at a signaling frequency, and means including a relay for connecting said generator to said transmitting channel; a tuned circuit connected to the output of said receiving channel, said circuit being tuned to pass signals received at a signaling frequency; a transmission network including a low pass filter and an attenuator, and switching means connected to said tuned circuit and responsive to reception of said last-mentioned signals, for connecting said network between said hybrid system input circuit and said receiving channel during reception of said last-mentioned signals, said filter having a cutoff below said signal frequencies.

5. In a communication system: a telephone transmission line adapted to transmit speech-frequency signals up to a preselected cutoff; a hybrid system connected to said transmission line, said system having an output circuit connected to a transmitting channel and having an input circuit connected to a receiving channel; a generator for generating signals at a signaling frequency below said transmission line cutoff, and means including a relay for connecting said generator to said transmitting channel; a tuned circuit connected to said receiving channel, said circuit being tuned to pass signals received at a signaling frequency below said transmission line cutoff; a transmission network including a low pass filter having a cutoff below said speech cutoff and below said signal frequencies, and switching means connected to the output of said tuned circuit and responsive to said received signals for connecting said network between said hybrid system input circuit and said receiving channel during the time said last-mentioned signals are received.

6. In a communication system: a transmission line connected to a hybrid system, said system having an output circuit connected to a transmitting channel, and having an input circuit connected to a signal receiving channel; a frequency generator for generating signals at a signaling frequency, and means including a relay for connecting said generator to said transmitting channel; a tuned circuit connected to said receiving channel, said circuit being tuned to pass a received signal; a first relay connected to the output of said tuned circuit, and responsive to said received signal; a second, slow operate and release relay responsive to said first; said second relay being energized during reception of said received signal; a transmission network, and switching means responsive to said second relay, for connecting said network between said hybrid system input circuit and said receiving channel during energization of said second relay, said network being adapted to suppress transmission of said received signal from said receiving channel output to said hybrid system input.

7. In a communication system: a telephone transmission line adapted to transmit speech frequencies up to a preselected cutoff; a hybrid system connected to said transmission line, said system having an output circuit connected to the input of a transmitting channel adapted to transmit said speech frequencies, and said system having an input circuit connected to the output of a receiving channel adapted to receive said speech frequencies; a generator for generating signals at a signaling frequency below said transmission line cutoff, and means including a relay for connecting said generator to the input of said transmitting channel; a tuned circuit connected to the output of said receiving channel, said circuit being tuned to pass signals received at a signaling signal frequency below said transmission line cutoff; a relay connected to the output of said tuned circuit and responsive to said received signals; a transmission network including a low pass filter, and switching means responsive to said relay, for connecting said network between said hybrid system input and said receiving channel output, said filter having a cutoff below said signaling frequencies; and means for transmitting and receiving said signaling frequencies at an energy level substantially higher than the energy level at which said frequencies are transmitted and received in said speech frequencies.

8. In a communication system: a pair of signal transmission channels extending between a pair of remote points, one channel being adapted to transmit signals in one direction and the other being adapted to transmit signals in the opposite direction; a hybrid system at each point having an output circuit connected to the outgoing channel and an input circuit connected to the incoming channel at said points, respectively; a transmission line connected to each hybrid system; a generator at each said point, for generating signals at a signaling frequency, together with relay means thereat for connecting said generator to said outgoing channel; a tuned circuit at each said point connected to said incoming channel, and tuned to pass the signals incoming from the distant generator; a transmission network at each said point and switching means connected to said tuned circuit and responsive to said incoming signals, for connecting the network thereat between the hybrid system input and the incoming channel during the reception of the incoming signals.

9. In a communication system: a transmission line connected to a hybrid system, said system having an output circuit connected to a transmitting channel, and having an input circuit connected to the output of a receiving channel; a frequency generator for generating signals of a first, and means including a relay for connecting said generator to said transmitting channel; a tuned circuit connected to the output of said signal receiving channel, said circuit being tuned to pass a received signal of a frequency different from the first; a transmission network, and switching means connected to the output of said tuned circuit and responsive to said received signal, for connecting said transmission network between said hybrid system input and said receiving channel during reception of said last-mentioned signal.

10. In a communication system: a transmission line connected to a hybrid system, said system having a output circuit connected to the input of a transmitting channel, and having an input circuit connected to the output of a receiving channel; a generator for generating signals of a first frequency, and means including a relay for connecting said generator to the input of said transmitting channel; a tuned circuit connected to the output of said receiving channel, said circuit being tuned to pass a received signal of a second frequency different from the first; means including a relay connected to the output of said tuned circuit, and responsive to said second frequency; a transmission network including a low pass filter, and switching means responsive to said relay, for connecting said network between said hybrid system input and said receiving channel output, said filter having a cutoff below said first and received signal frequencies.

11. In a communication system: a transmission line connected to a hybrid system, said system having an output circuit connected to the input of a transmitting channel, and having an input circuit connected to the output of a receiving channel; a generator for generating signals of a first frequency, and means including a relay for connecting said generator to the input of said transmitting channel; a tuned circuit connected to the output of said receiving channel, said circuit being tuned to pass a received signal of a frequency different from the first; a transmission network including an attenuator, and switching means connected to the output of said tuned circuit and responsive to said received signal, for connecting said network between said hybrid system input and said receiving channel output during reception of said last-mentioned signal.

12. In a communication system: a transmission line connected to a hybrid system, said system having an output circuit connected to the input of a transmitting channel, and having an input circuit connected to the output of a receiving channel; a generator for generating signal of a first frequency, and means including a relay for connecting said generator to the input of said transmitting channel; a tuned circuit connected to the output of said receiving channel, said circuit being tuned to pass a received signal of a frequency different from the first; means including a relay connected to the output of said tuned circuit and responsive to said received signal frequency; a transmission network comprising a low pass filter and an attenuator, and switching means responsive to said relay, for connecting said network between said hybrid system input and said receiving channel output, said filter having a cutoff below said first and received signal frequencies.

13. In a communication system: a telephone transmission line adapted to transmit speech frequencies up to a preselected cutoff; a hybrid system connected to said transmission line, said system having an output circuit connected to the input of a transmitting channel for said speech frequencies, and said system having an input circuit connected to the output of a receiving channel for said speech frequencies; a generator for generating signals of a first frequency below said transmission system cutoff, and means including a relay for connecting said generator to the input of said transmitting channel; a tuned circuit connected to the output of said receiving channel, said circuit being tuned to pass received signals of a frequency below said transmission line cutoff, different from said first frequency; means including a relay connected to the output of said tuned circuit and responsive to said received signals; a transmission network including a low pass filter having a cutoff below the speech cutoff and below said signaling frequencies, and switching means responsive to said relay, and actuatable to one position, for connecting said network between said hybrid system input and said receiving channel output, said switching means being actuatable to a second position for substituting a direct connection for said network.

14. In a communication system: a transmission line connected to a hybrid system, said system having an output circuit connected to the input of a transmitting channel, and said system having an input circuit connected to the output of a receiving channel; a generator for generating signals of a first frequency, and means including a relay for connecting said generator to the input of said transmitting channel; a tuned circuit connected to the output of said receiving channel, said circuit being tuned to pass received signals of a frequency different from the first; a first relay connected to the output of said tuned circuit, and responsive to said second frequency signals; a second, slow operate and release relay responsive to said first relay, said second relay being energized during reception of said second frequency signals; a transmission network, and switching means responsive to energization of said second relay, for connecting said network between said hybrid system input and said receiving channel output during energization of said second relay and for by-passing said network upon release of said relay, said network being adapted to suppress transmission of said signaling frequencies between said receiving channel output to said hybrid system input.

15. In a communication system: a telephone transmission line adapted to transmit speech frequencies up to a preselected cutoff; a hybrid system connected to said transmission line, said system having an output circuit connected to the input of a transmitting channel adapted to transmit said speech frequencies, and said system having an input circuit connected to the output of a receiving channel adapted to receive said speech frequencies; a generator for generating signals of a first frequency below said cutoff, and means including a relay for connecting said generator to the input of said transmitting channel; a tuned circuit connected to the output of said receiving channel, said circuit being tuned to pass received signals of a frequency below said cutoff, different from said first frequency; a relay connected to the output of said tuned circuit and responsive to said second frequency signals; a transmission network including a low pass filter, and switching means responsive to said relay in one position, for connecting said network between said hybrid coil input and said receiving channel output and for by-passing said network in a second position, said filter having a cutoff below said first and received signaling frequencies and below said speech cutoff; and means for transmitting and receiving said first and received signaling frequencies at an energy level substantially higher than the energy level at which said frequencies are transmitted and received in said speech frequencies.

16. In a communication system: a pair of transmission channels extending between a pair of remote points, one channel being adapted to transmit in one direction and the other being adapted to transmit in the opposite direction; a hybrid system at each point having an output circuit connected to the outgoing channel and an input circuit connected to the incoming channel at said points respectively; a transmission line connected to each hybrid system; a generator at each said point, for generating signals of a first and a second frequency, respectively, together with relay means at each point for connecting the generator thereat to said outgoing channel; a tuned circuit at each point connected to said incoming channel, and tuned to pass signals of the incoming frequency; means including a two-position relay connected to the output of each said tuned circuit, said relay normally occupying a second position and being operated by incoming signals to a first position; a transmission network at each point and switching means thereat responsive to said relay thereat in said first position, for connecting said transmission networks, respectively, between the hybrid system input and said incoming channel, and responsive to said relay in said second position for by-passing said networks, said networks being adapted to reduce transmission of said signaling frequencies between said receiving channels and said hybrid system input at each point.

17. In a communication system: a transmission line connected to a hybrid system, said system having an output circuit connected to the input of a transmitting channel, and having an input circuit connected to the output of a receiving channel; a generator for generating signals of a first frequency, and means including a relay for connecting said generator to said transmitting channel; a tuned circuit connected to the output of said receiving channel, said circuit being tuned to pass received signals of a frequency different from the first; a first, fast-operating relay means connected to the output of said tuned circuit, and responsive to said received signals; a second two-position, slow operate and release relay means responsive to said first relay, said relay normally being in a second position and being actuated into a first position by response of said first relay to said received signals; a transmission network, and switching means responsive to said second relay means in said first position, for connecting said network between said hybrid coil input and said carrier receiver output, and responding to said second relay means in said second position for by-passing said network, said network being adapted to suppress transmission of said signaling frequencies between said hybrid system input and said receiving channel and tuned circuit.

18. In a communication system: a transmission line connected to a hybrid system, said system having an output circuit connected to a transmitting channel and having an input circuit connected to a receiving channel; a signal generator for generating a signal of a predetermined frequency, and means for connecting said generator to said transmitting channel; an accepance circuit connected to said receiving channel, said acceptance circuit passing received signals of a predetermined frequency; a transmission network; and switching means connected to the output of said acceptance circuit and responsive to received signals for connecting said network between said hybrid system input circuit and said receiving channel during reception of said last-mentioned signals of a predetermined frequency.

19. In a communication system: a transmission line connected to a hybrid system, said system having an output circuit connected to a transmitting channel and having an input circuit connected to a receiving channel; a signal generator for generating signals at a signaling frequency, and means for connecting said generator to said transmitting channel; an acceptance circuit connected to said receiving channel, said acceptance circuit passing received signals of a predetermined frequency; a transmission network including a low pass filter; and switching means connected to the output of said acceptance circuit and responsive to received signals for connecting said network between said hybrid system input circuit and said receiving channel, said filter having a cut-off below said signaling frequencies.

EVERHARD H. B. BARTELINK.

REFERENCES CITED

The following references are of record in the file of this patent:

UNITED STATES PATENTS

| Number | Name | Date |
|---|---|---|
| 1,454,159 | Espenschield | May 8, 1923 |
| 1,463,200 | Davidson | July 31, 1923 |
| 1,540,849 | Loynes | June 9, 1925 |
| 1,611,350 | Jammer | Dec. 21, 1926 |
| 1,999,346 | Taylor | Apr. 30, 1935 |
| 2,064,958 | Taylor | Dec. 22, 1936 |
| 2,209,667 | Taylor | July 30, 1940 |

FOREIGN PATENTS

| Number | Country | Date |
|---|---|---|
| 396,444 | Great Britain | Aug. 4, 1833 |